United States Patent [19]
Darnell

[11] 3,998,065
[45] Dec. 21, 1976

[54] HORIZONTAL WELLPOINTING METHOD AND APPARATUS

[75] Inventor: James K. Darnell, Orlando, Fla.

[73] Assignee: Charles F. Smith and Son, Inc., Kennett Square, Pa.

[22] Filed: Oct. 9, 1975

[21] Appl. No.: 621,078

[52] U.S. Cl. .................................. 61/72.6; 61/11; 138/140

[51] Int. Cl.² ...................... F16L 1/00; E02B 11/02

[58] Field of Search .............. 61/11, 13, 72.6, 72.5, 61/72.2, 72.1, 63; 138/140

[56] References Cited
UNITED STATES PATENTS

| | | | |
|---|---|---|---|
| 3,830,373 | 8/1974 | Sixt | 61/11 X |
| 3,859,809 | 1/1975 | Clayhold | 61/11 X |
| 3,874,182 | 4/1975 | Potter et al. | 6/72.5 |
| 3,908,385 | 9/1975 | Daniel et al. | 61/11 |

FOREIGN PATENTS OR APPLICATIONS

| | | | |
|---|---|---|---|
| 1,176,064 | 8/1964 | Germany | 61/11 |

Primary Examiner—Jacob Shapiro
Attorney, Agent, or Firm—John E. Benoit

[57] ABSTRACT

A horizontal wellpointing system is provided wherein a trenching vehicle digs a trench while perforated flexible pipe having a filter material is placed along the trench. The pipe is covered as the trench is refilled and a subsequent evacuating pressure is applied to the pipe by an above ground pump.

10 Claims, 6 Drawing Figures

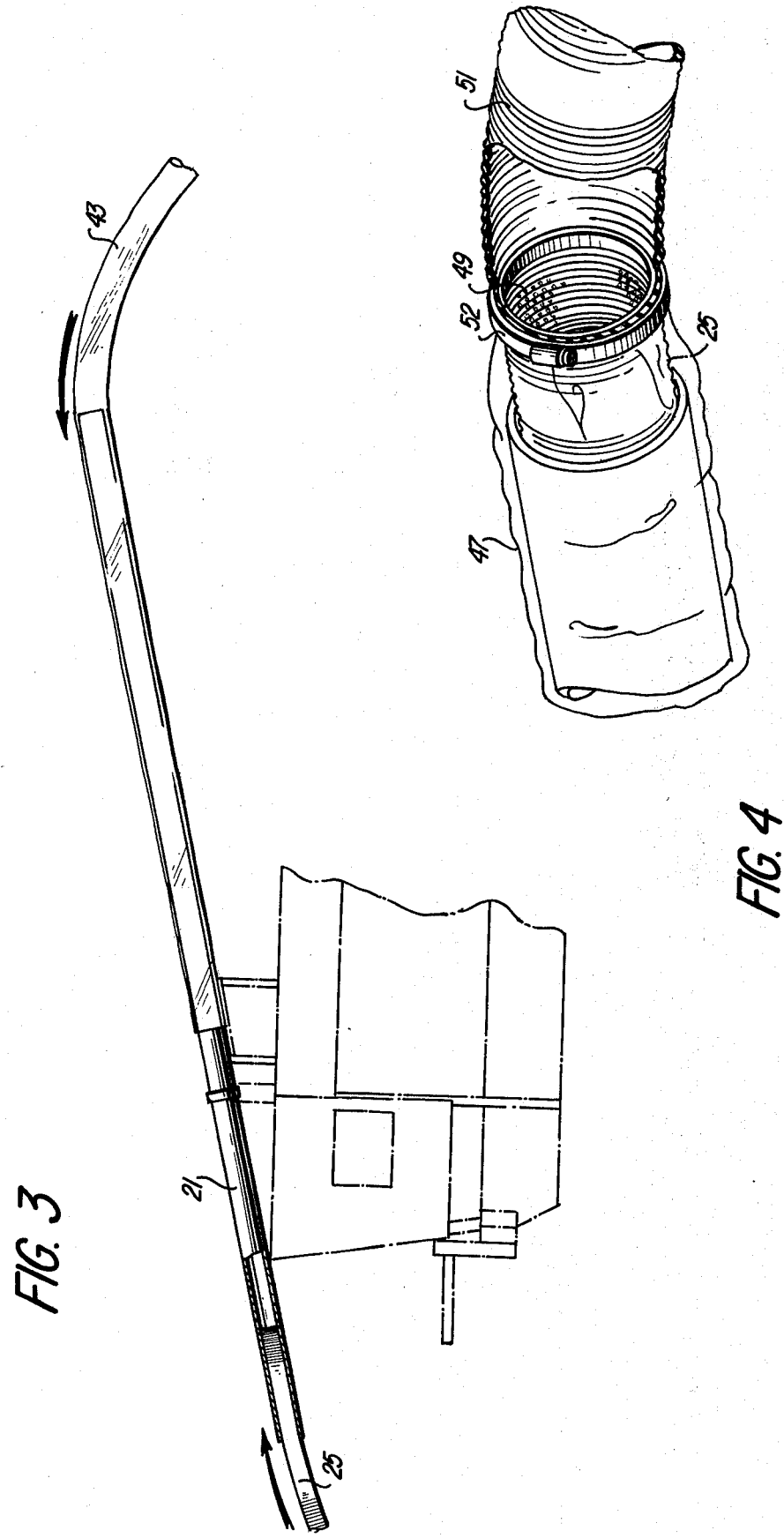

HORIZONTAL WELLPOINTING METHOD AND APPARATUS

This invention relates generally to drainage of underground water and more specifically to a method and apparatus for horizontal drainage in sub-soil strata.

Groundwater level has always interfered with construction activities in subsoil-strata. Vertical well pointing has been the main method used to evacuate such groundwater. In this system each wellpoint generally comprises a tubular body having passages therein to direct a jetting fluid downwardly through the wellpoint to enable the wellpoint to be sunk into the ground by the eroding or displacing action of the jetting fluid. In addition, each wellpoint is provided with an intake, usually screened or filtered to prevent stones and other particles from entering the intake where they would ultimately be drawn up into the system and cause damage thereto. Individual wellpoints are spaced at intervals along the ground so as to cover the area to be dewatered.

Vertical wellpointing has numerous inherent disadvantages. Since the wellpoints must be installed individually and later removed for further use, labor costs are high and there is a low installation speed per man on the job. Further, a relatively high investment in equipment is required. Also, the use of multiple vertical wellpoints places obstacles on the site itself. There is also the possibility of intentional or unintentional damage to these vertical installations by construction machines or unauthorized persons on the construction site.

Accordingly, it an object of this invention is to provide a method and apparatus for horizontal wellpointing.

A further object of this invention is to provide a means for installing a length of perforated pipe in subsoil with groundwater evacuation by pumping.

Another object of the invention is to provide a method for simultaneously digging a trench, laying perforated plastic pipe in the trench, back covering the layed pipe and subsequently applying a suction to one end of the pipe.

These and other objects of the invention will become apparent from the following discriptions when taken in conjunction with the drawings wherein FIG. 1 is a perspective view illustrating one embodiment of the equipment used;

FIG. 3 is an elevational view of the pipe handling and covering apparatus of the equipment of FIG. 1;

FIG. 4 is a partial view of one end of the apparatus of FIG. 3;

Broadly speaking the invention relates to an apparatus and method for providing horizontal wellpointing wherein a trenching vehicle includes a means for feeding a perforated pipe covered with a filter material to a point immediately behind the end of the trencher whereby the pipe is laid substantially simultaneously with the digging of the trench. One end of the pipe is capped while the other end is connected by a non-perforated section of pipe to a pump or the surface of the ground. The pipe is then covered and evacuated by said pump.

Figure 1:
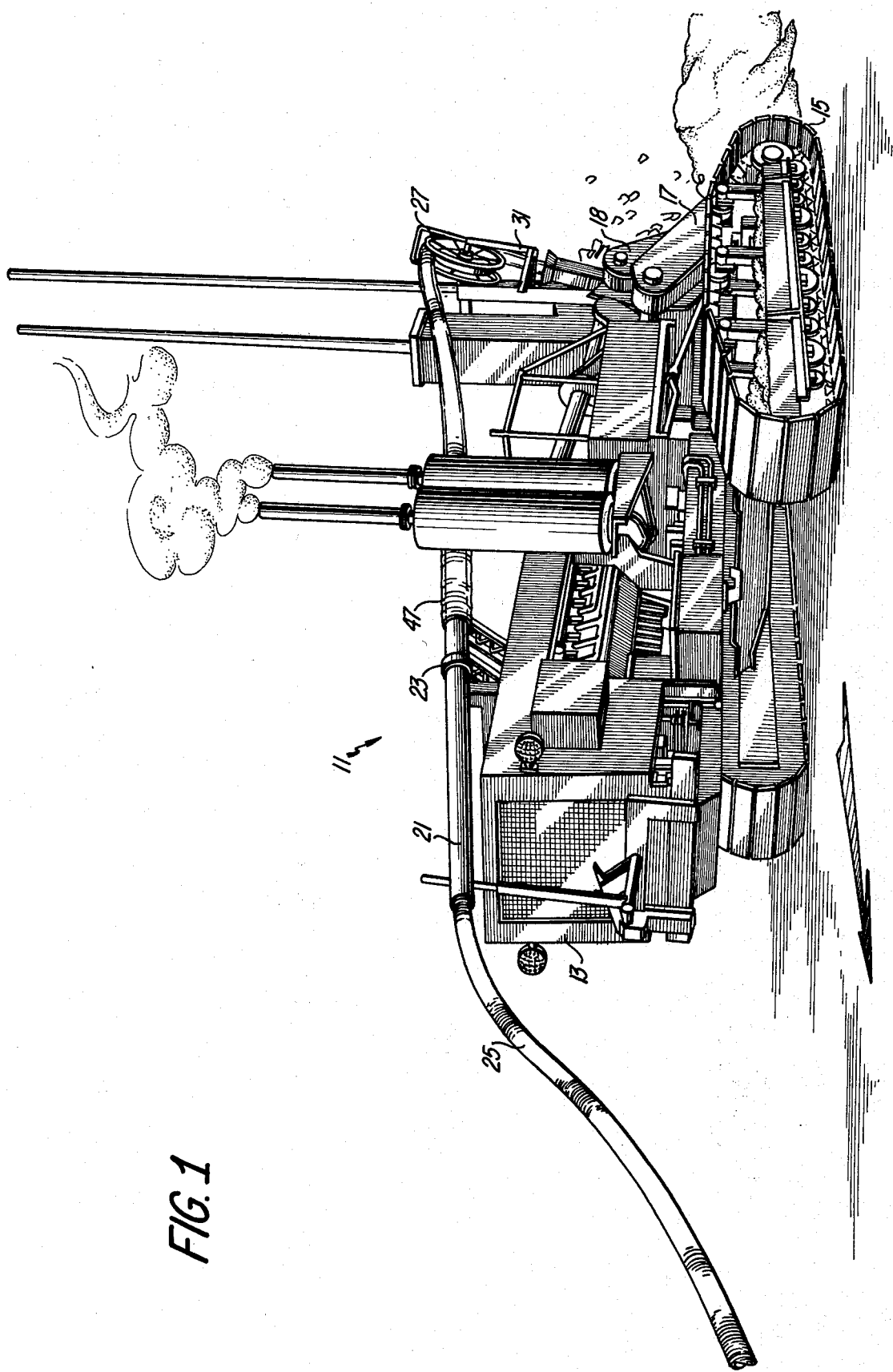
Figure 2:
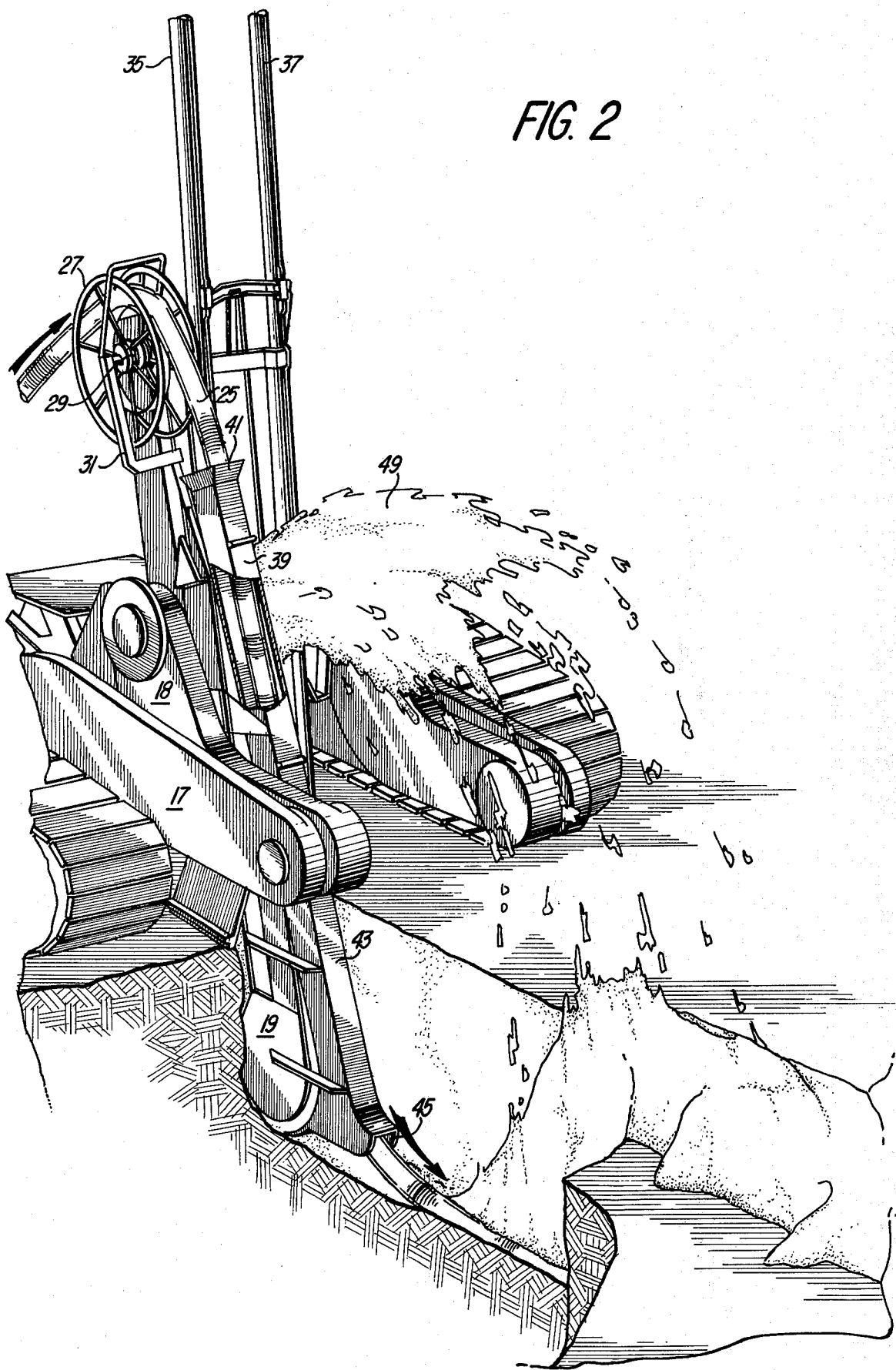
FIG. 2 is a perspective view partially in section of the trenching and pipe laying apparatus of the equipment of FIG. 1.

Turning now to the drawings, there is shown in FIGS. 1 and 2 a vehicle 11 designed and built to be used as a trenching machine. The basic machine includes a motor and drive train housing 13 with tractor type treads 15. Pivotal supporting braces 17 and 18 are provided at the rear of the machine to control the position of the trenching mechanism 19. The basic vehicle as shown including the equipment mentioned above is manufactured by Steenbergen Hollanddrain of Klaaswaal, Holland. It is to be understood that the present invention is not limited to use with this particular vehicle.

The apparatus of the present invention is mounted on the vehicle described as discussed hereinafter.

A first rigid conduit 21 is mounted on the vehicle housing 13 by any known means, such as bracket 23, so as to maintain the axis thereof in a general fore and aft configuration. As so mounted, conduit 21 faces in the direction of movement of the vehicle.

A flexible perforated pipe 25 is shown passing through conduit 21 and extending rearwardly over a rotating guide wheel 27 including guide rails. The axle 29 of wheel 27 is mounted to one of two parallel rails 35 and 37 by means of supporting structure 31.

As shown more clearly in FIG. 2, pipe 25 is fed into a second conduit 39 having a flared opening 41. Conduit 39 is mounted to trenching mechanism 19 by means such as braces 43. The other end of conduit 39 terminates in a curved section 45 which feeds the pipe 25 rearwardly of trencher mechanism 19. The trencher mechanism is so designed, for the particular vehicle shown, that the soil 44 which is removed while trenching is discharged rearwardly so as to refill the trench immediately. Thus, the trenching, laying of the pipe, and the covering of said pipe and trench are accomplished in a single operation.

Since the pipe 25 is to be used for removal of water in the soil, it must be perforated as indicated generally at 49 in FIG. 4. The particular pipe shown is corrugated with the perforations being located in the valleys of the corrugations. One such flexible pipe is shown in U.S. Pat. No. 3,830,373. Additionally, as indicated therein, a filter means is desireable in order to prevent clogging of the perforations by large dirt particles. One such filter screen is also shown in the above-identified patent. This screen is fabricated of a spun bound filamentary material.

In order to provide a covering for the tube which is being used in the present invention a sleeve 47 of the filter material is slipped over one end of conduit 21 as shown in FIG. 4. The sleeve is the approximate length of the particular pipe to be used in specific job being performed so as to enclose the performed pipe. The sleeve is manually bunched upon the pipe as indicated in FIG. 4. This permits the attachment of the sleeve 47 at one end to the first end of the corrugated tubing as it passes out of conduit 21 as will be subsequently explained.

In order to provide proper evacuation of the water at the desired underground level, all of the suction force should be applied at that level. Accordingly, a section of non-perforated flexible pipe 51 is attached to that end of the perforated pipe which first exits from conduit 21. As shown in FIG. 4, this may also be a corrugated pipe which snaps over the corrugated perforated pipe. A clamp 52 may be used to further secure the pipes together and retain the sleeve 47. If a clamp is not used, the sleeve may be taped about the junction between the two pipes.

Figure 5:
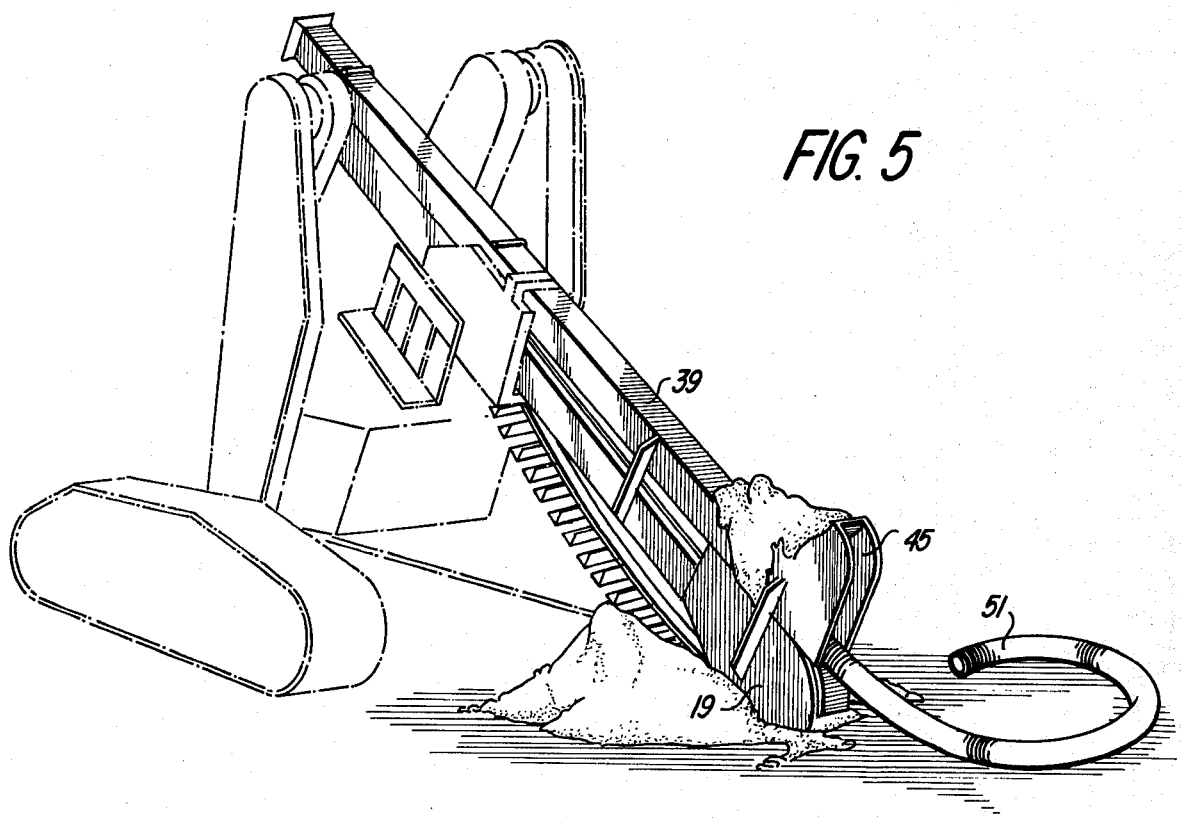
FIG. 5 is a partial view illustrating the initiation of the laying of a section of pipe.
Figure 6:
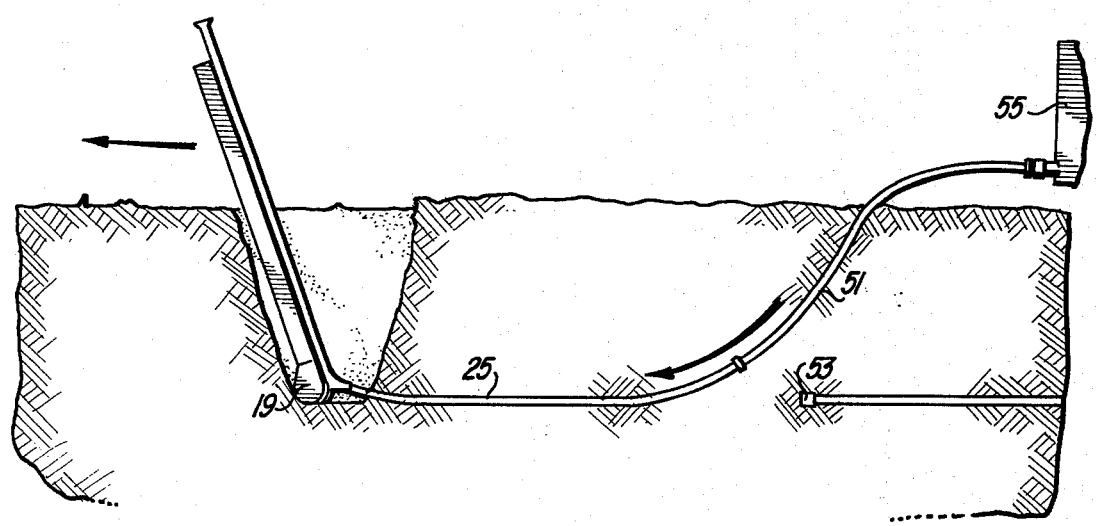
FIG. 6 is a schematic view illustrating the pipe in place and the suction drainage thereof.

As illustrated in FIG. 5, the non-perforated pipe must be laid above ground so that it may be attached to a pump 55 (shown schematically in FIG. 6). This is accomplished by feeding the non-perforated pipe through conduit 39 before the actual trenching begins so that a length thereof lays along the surface of the ground. The trenching mechanism is then activated and rotated to the vertical position while the non-perforated pipe 51 is fed through conduit 39. The pipe 51 is of a length to match the depth of the trench to be dug so that the coupling between the perforated and non-perforated pipes occurs as that depth is reached.

FIG. 6 is a schematic illustration showing the system as it is used. One length of pipe has already been installed at the proper level with the open end closed by cap 53. The next section shows the non-perforated pipe 51 attached to the pump 55 at one end and coupled to the perforated pipe 25 at the other end. The perforated pipe also has the filter covering extending the length thereof.

From the above description, the advantages of the present invention over the standard vertical wellpointing system will be obvious. The system of the present invention can be installed at rates of up to approximately 500 feet per/hr. Also, it can be installed at any time before a major work is begun, thereby eliminating the need to work alongside other contractors.

The present system can be activated at any time after the perforated pipe has been laid by connecting it to a suitable pump. Therefore, if delays between installation and use occur, the contractor is only confronted with pump rental costs. There are no system maintenance requirements during this time.

The system as described herein provides a more effective draw down of water than does a vertical wellpointing system since the suction line is horizontal and continuous. Further, under difficult strata conditions, the machine breaks up the ground more effectively, thus allowing the water to penetrate more easily down to the selected suction level.

Since the length of any one piece of perforated pipe may be selected for convenience relative to the entire operation, the pumps, which are the only above ground equipment, can be located to suit site conditions.

All of the above advantages, which include a reduction of labor costs, lead to considerable savings over conventional vertical wellpointing.

It is to be understood that the above description and drawings are illustrative only as to specific equipment used since various equivalents could be used without departing from the scope of the invention which is to be limited only by the following claims.

I claim:
1. In a vehicle having a mechanically driven trencher at one end thereof, a system for laying a flexible perforated pipe in the trench created by said trencher comprising
   a first rigid conduit mounted on said vehicle having its axis extending substantially in the direction of movement of said vehicle;
   a second rigid conduit mounted adjacent said trencher with one end thereof terminating at the bottom of said trencher; both of said conduits being of a dimension to accept said flexible pipe, said first and second conduits being separated;
   tubular filter fabric freely positioned about said first rigid conduit;
   means for securing one end of said tubular filter fabric about the forward end of said pipe as it passes between said first and second rigid conduits; and
   means for guiding said pipe and said fabric into and through said second conduit, whereby said pipe covered with said fabric is placed in said trench behind said trencher.
2. The system of claim 1 further comprising
   pump means connected to said forward end of said pipe for applying an evacuating pressure to said pipe.
3. The system of claim 2 wherein said pump means comprises
   a section of non-perforated pipe coupled at one end to said forward end of perforated pipe and extending above ground; and
   a power driven suction pump coupled to the other end of said non-perforated pipe.
4. The system of claim 1 further comprising
   cap means secured to the other end of said perforated pipe.
5. The system of claim 1 wherein said means for guiding said pipe comprises
   a rotatable wheel including side rails secured to said vehicle between said first and second rigid conduits.
6. A system for providing horizontal wellpointing comprising
   means for digging a trench at a selected ground site;
   a flexible perforated pipe having a filter means about its periphery;
   means for laying said pipe in said trench;
   means for covering said pipe and refilling said trench; and
   means for apply an evacuating pressure to said pipe.
7. The system of claim 6 wherein said means for applying an evacuating pressure comprises
   a cap for sealing one end of said pipe; and
   a pump connected to the other end of said pipe.
8. A method for providing horizontal wellpointing which comprises
   digging a trench at a selected ground site;
   laying a flexible perforated pipe having a filter means about its periphery horizontally in said trench;
   covering said pipe and refilling said trench; and
   applying an evacuating pressure to said pipe.
9. A method for providing horizontal wellpointing which comprises the steps of
   digging a ground trench to a predetermined depth;
   feeding a flexible perforated pipe into said trench as said trench is being dug;
   enclosing said perforated pipe with a filter material during said feeding step and before said pipe enters said trench;
   connecting one end of said pipe to an evacuating pump by means of a non perforated pipe;
   sealing the other end of said pipe; and
   covering said pipe with the soil removed during the digging of said trench.
10. The method of claim 9 further comprising the steps of securing one end of said filter material between said perforated pipe and said non perforated pipe, and securing the other end of said filter material to the other end of said perforated pipe.

* * * * *

UNITED STATES PATENT AND TRADEMARK OFFICE
CERTIFICATE OF CORRECTION

PATENT NO. : 3,998,065
DATED : December 21, 1976
INVENTOR(S) : James K. Darnell

It is certified that error appears in the above—identified patent and that said Letters Patent are hereby corrected as shown below:

CANCEL Claims 6, 7 & 8.

On the cover page "10 Claims" should read -- 7 Claims --.

Signed and Sealed this

Seventh Day of March 1978

[SEAL]

Attest:

RUTH C. MASON
*Attesting Officer*

LUTRELLE F. PARKER
*Acting Commissioner of Patents and Trademarks*